Jan. 1, 1935.  C. F. WALLACE  1,986,308
WEIGHING APPARATUS
Filed Dec. 14, 1928   2 Sheets-Sheet 1
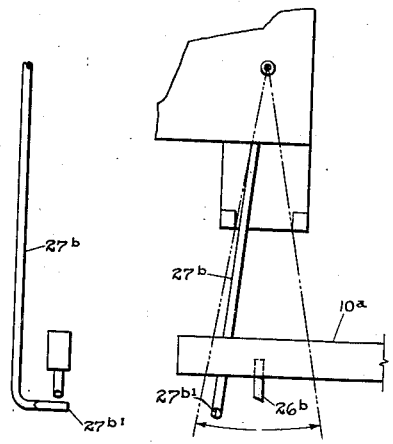
Fig.7.  Fig.6.
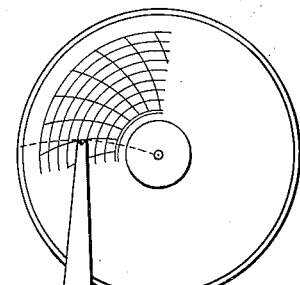
Fig.2.
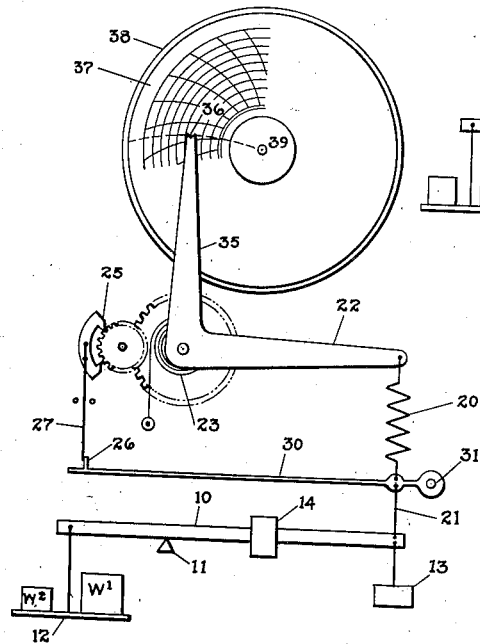
Fig.1.
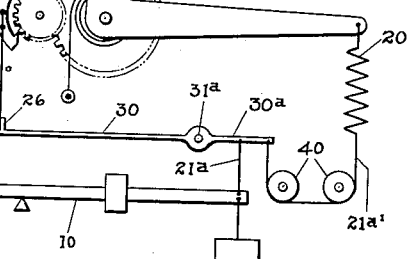
INVENTOR.
Charles F. Wallace
BY Arthur L. Kent
his ATTORNEY

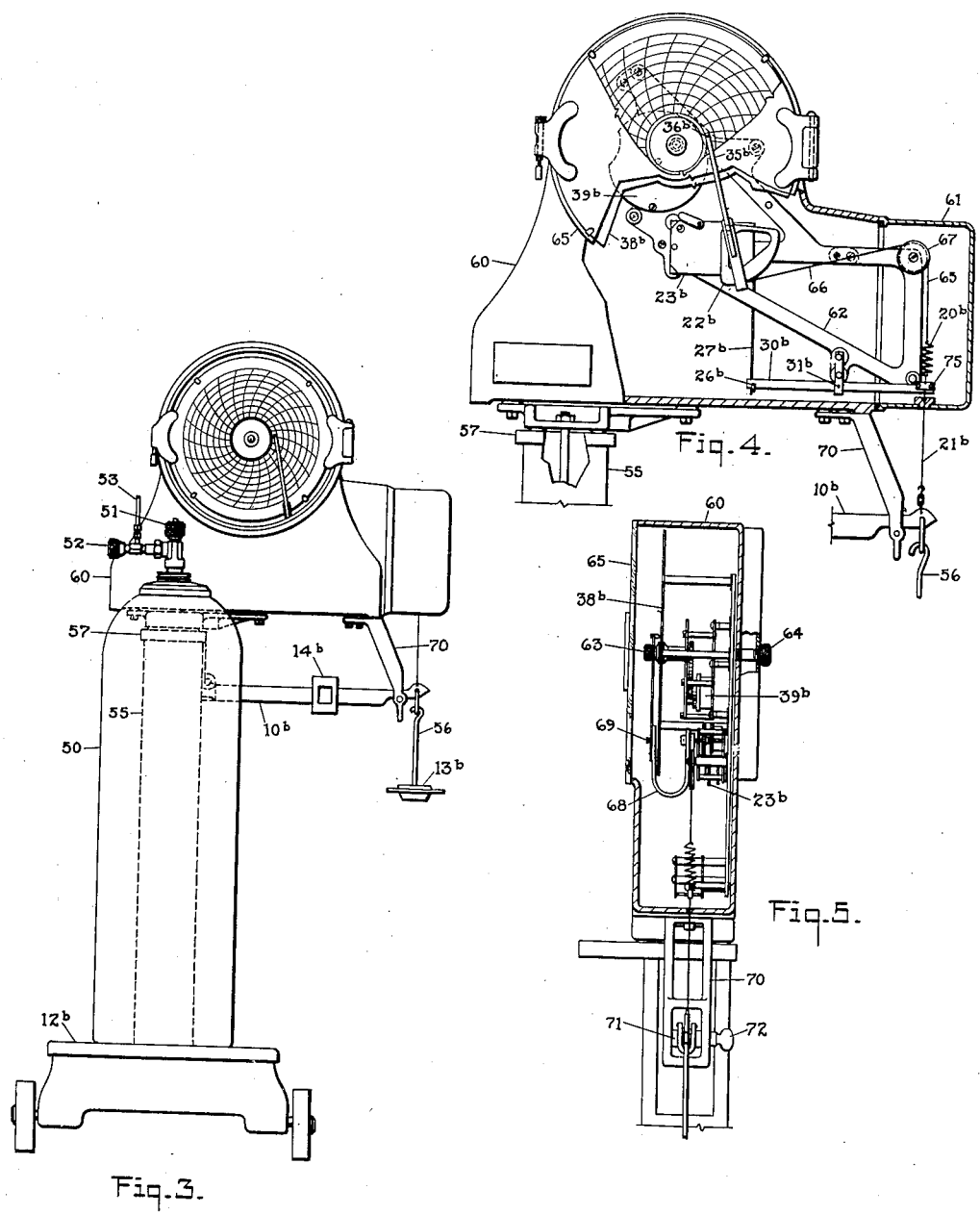

Patented Jan. 1, 1935

1,986,308

UNITED STATES PATENT OFFICE 1,986,308

WEIGHING APPARATUS

Charles F. Wallace, Westfield, N. J., assignor to Wallace & Tiernan Products, Inc., Belleville, N. J., a corporation of New Jersey Application December 14, 1928, Serial No. 326,072

8 Claims. (Cl. 265—9)

This invention relates to apparatus for indicating and recording change in weight of objects, the word "objects" being used in a broad sense to include substance in various forms and conditions. The invention aims to provide an improved recording scale or weighing apparatus whereby change in weight over a period of time, whether an increase or a decrease in weight, and the rate of change, whether sudden or gradual, and if gradual, whether constant or varying, will be accurately recorded automatically. Recording apparatus according to the invention comprises in combination with the scale a chronographic record member and a recording member and means for causing a relative movement between said members for recording time, and means for causing a relative movement between said members in a direction transverse to the time movement which is proportional to change in weight on the scale for recording such change in weight.

While features of the invention are adaptable to all kinds of scales, including spring scales, the invention has been made more particularly with the object of providing apparatus for indicating and recording change of weight on a beam scale or balance member weighing apparatus wherein the weight of the object being weighed is measured by the weight or force, acting counter to the weight of the object, required to bring the scale beam or other movable, or balance, member to a pre-determined position of balance, as distinguished from a spring scale, wherein the measure of the weight of the object is the amount of yield of a spring under the weight of the object. As applied to such a balance member weighing apparatus, the invention is of value for indicating change of weight without recording.

Indicating and recording mechanism according to the invention as applied to a beam scale or other balance member weighing machine, comprises means for automatically re-balancing the movable or balance member of the scale as the weight of the object being weighed changes, such means including motor driven means controlled according to the position of the balance member of the scale and which, when the balance member moves out of its position of balance, operates to change a counter force acting on the balance member to return it to its position of balance, and means for causing a relative weight recording movement of the recording device proportional to the operation of said motor driven means.

The invention may be applied to various uses. It may be used, for example, for showing the quantity of a fluid substance used in a given period of time and the rate of use. In the use of apparatus for purifying water by the application of small proportionate amounts of chlorine drawn from a container of liquid chlorine, it is desirable to know the rate of use of the chlorine and the amount remaining in the container. The invention provides means for automatically recording on a chart the amount of chlorine withdrawn from a container placed on a scale platform and the rate of withdrawal over a period of time. Another use of apparatus according to the invention is for ascertaining and recording increase in weight when a container is being filled. Used in this way, the invention provides, for example, means for readily measuring the flow of water through meters when they are being calibrated or tested.

A full understanding of the invention can best be given by a detailed description of recording and indicating apparatus embodying the invention, and such a description will now be given in connection with the accompanying drawings, in which:

Fig. 1 is a diagrammatic view of a simple form of apparatus in accordance with the invention for indicating and recording loss of weight;

Fig. 2 is a similar view of an apparatus for indicating and recording increase of weight;

Fig. 3 is a front elevation of a platform scale provided with apparatus according to the invention for indicating and recording decrease in weight;

Fig. 4 is a view of the re-balancing and indicating and recording apparatus viewed from the front with the casing partly broken away and partly in section;

Fig. 5 is a view taken from the right of Fig. 4 with the head casing partly broken away and partly in section; and Figs. 6 and 7 are detailed views of the escapement control mechanism.

Referring to the drawings, and first to Fig. 1, the apparatus is here shown as applied to a beam scale having a beam 10 fulcrumed at 11 and having its short arm connected to a platform 12 and its long arm provided with a counterweight 13 suspended in any usual or suitable manner from the end of the arm and also with a sliding counterweight 14 by which the beam may be brought into exact balance in the usual way. After the scale beam has been balanced with the object to be weighed on the scale platform 12, any decrease in the weight on the platform will result in the long arm of the scale beam moving downward under the force of its counterweights.

The indicating and recording mechanism comprises means for moving the scale beam back to its position of balance, most desirably by exerting an upwardly moving force on the long arm of the beam. Such means as here shown comprises a calibrated re-balancing spring 20, one end of which is connected by a cord or other connecting means 21 to the long arm of the beam 10 and the other end of which is connected to a lever arm 22 which is mounted to be moved to increase the tension on the spring by a spring motor 23. The lever 22 in the construction shown is mounted fast on the main shaft of the spring motor. The rate at which the motor moves the arm is controlled by a clock train, including a suitable escapement device 25, and operation of the motor for moving the arm to increase the tension on the spring 20 is normally prevented when the scale beam is in balance by the engagement of a stop member 26 with an arm 27 extending from the escapement lever 25. The stop 26 is carried by an arm or lever 30 pivoted at 31 and connected to the scale beam so that when the beam moves downward from its position of balance the escapement release lever 30 will be moved downward to carry the stop 26 out of engagement with the escapement arm 27. The connection between the scale beam 10 and the escapement release lever is most desirably by means of the connection 21 between the balancing spring and the scale beam. In order to avoid injury to the mechanism the connection 21 is most desirably a cord or other flexible connection.

An arm 35 extending upward from the spring arm 22 carries at its upper end a pen 36 which is adapted to trace a mark on a chronographic chart 37 mounted on a chart support 38 which is slowly turned at a timed rate when the apparatus is in operation by clock mechanism indicated at 39. The chart for use on the apparatus shown is a circular sheet marked, as indicated on the drawings with concentric weight rulings and radial time rulings curved in the usual manner according to the radius of the pen arm.

The operation of the device is as follows. Suppose the object or thing to be weighed to consist of a plurality of separate bodies W1 and W2. Such bodies having been placed on the scale platform and the scale beam having been balanced by the counterweights 13 and 14 with the pen arm moved to the right in Fig. 1 to a starting position, the spring tensioning motor being wound up and the chart support being rotated by its clock mechanism with the chart positioned with relation to the pen according to the time of day, the escapement release lever will be in the position shown with its stop 26 holding the escapement arm against oscillating movement. The parts will remain in this position so long as the scale beam remains in its balanced position, and the pen will trace a line on the chart which is parallel with the concentric weight rulings on the chart thus recording a condition of no change of weight on the scale.

If, now, one of the bodies, say W2, be removed from the scale platform, the long arm of the scale beam will be moved downward by its counterweights, and this movement of the scale beam will move the escapement release lever downward to release the escapement arm, and the spring tensioning motor will then operate to move the spring arm 22 upward, thereby gradually increasing the tension of the spring 20. As the tension of the spring 20 increases, it will exert an increasing upward pull on the long arm of the scale beam tending to raise it. The spring tensioning motor will continue to operate until the tension of the spring 20 is sufficient to move the scale beam back to its position of balance, at which time the escapement release lever 30 will have been moved back to its normal position in which its stop 26 projects into the path of the movement of the end of the escapement arm 27 and stops further oscillating movement of the escapement arm and consequently further operation of the spring tensioning motor.

During the movement of the arm 22 to increase the tension of the spring 20, the pen arm 35 will be correspondingly moved to the left in Fig. 1, and this movement of the pen arm will be in proportion to the increase in lifting force which the spring 20 exerts on the scale beam. And as this increase in lifting force exerted by the spring 20 on the scale beam required to re-balance the beam is proportional to the decrease in weight on the scale platform, the mark traced by the pen on the chart will extend outward transversely of the concentric weight lines, thus recording the decrease in weight on the scale platform and the time at which it occurs.

As by removal of the weight W2 from the platform of the scale a considerable weight is removed suddenly from the scale, the pen will be caused to move a distance corresponding to the loss of this weight as quickly as the spring tensioning lever and pen arm 35 can be moved by the motor 23, and the mark made on the chart indicating this loss of weight will be substantially parallel to the adjacent radial time markings, thus showing that the loss of weight from the scale platform was sudden. Thereafter, if no further weight were removed from the scale, the pen would continue to mark a line on the chart parallel with the concentric weight lines.

If, however, the decrease in weight on the scale platform were gradual, the pen arm would be moved outward at a corresponding rate and would trace a mark on the chart extending gradually outward in a direction corresponding to and showing the rate of weight decrease. Suppose, for example, that in place of the weights W1 and W2 on the platform of the scale, there is set on the platform a vessel containing water and having a valve-controlled outlet for discharging water therefrom. The scale being balanced as before, and the apparatus set for operation, if water is permitted to flow from the vessel there will be a continuous loss of weight from the platform of the scale. As soon as the loss of weight from the scale platform resulting from such discharge of water from the vessel is sufficient to cause the scale beam to move from its position of balance sufficiently to release the escapement arm, the automatic re-balancing mechanism will operate to re-balance the scale beam, and such operation will take place at intervals according to the rate of discharge of the water. The pen arm will be moved outward proportionately to the operation of the motor 23 and tensioning of the re-balancing spring 20, and its movement will, therefore, be proportionate to the loss of weight from the scale platform. The chart being constantly rotated, the pen will thus trace a line extending gradually outward on the chart in a curve which will indicate the loss of weight on the scale and the rate of loss for any given period of time. As the operation of the re-balancing mechanism will under these supposed conditions be intermittent, the line thus traced by the pen on the chart will be made up of a succession of short lines substantially parallel to the concentric weight line of the chart connected by short outwardly extending lines, but the effect will be that of a continuous curve.

When the chart and pen are mounted so as to be visible, the pen arm and pen in cooperation with the chart on the time driven chart support serves to show the change in weight on the scale in two ways: that is, by visually indicating the total change in weight and the elapsed time, and by recording the change and the time and the rate of change on the chart. Without the time driven member, only the total weight change would, of course, be shown.

Fig. 2 shows diagrammatically an apparatus similar to that shown by Fig. 1 except it is modified so as to be adapted to indicate and record increase of weight. By increase of weight on the scale platform, the long arm of the scale beam 10 is raised, and in order that upward movement of the long arm of the beam shall operate the escapement release lever to move the stop 26 down out of engagement with the escapement arm 27, the release lever is provided with an extension 30a beyond its pivot 31a, and the connection between the release lever and the scale beam is by means of a rigid connection 21a extending to the extension 30a. The connection between the re-balancing spring 20 and the long arm of the scale beam is also shown as being made through the connection 21a and the extension 30a by a connecting cord 21a' which extends downward about pulleys 40 and then upward to the extension 30a, so that the force of the spring 20 will be exerted to move the extension 30a downward, that is, against the upward thrust which the beam exerts through the connection 21a when the beam moves away from its position of balance on increase in weight on the scale platform. The result is obviously the same as though the spring 20 were connected to pull upward on the escapement release lever at a point between its pivot 31a and the stop 26, or even connected directly to the scale beam, to the left of the fulcrum in Fig. 2 if connected to pull upward or to the right of the fulcrum if connected to pull downward.

Otherwise, the apparatus as shown in Fig. 2 is the same as that shown in Fig. 1, and the operation on increase in weight on the scale platform corresponds to the operation on decrease in weight on the scale platform of the apparatus of Fig. 1.

Referring now to Figs. 3 to 7, these figures illustrate a platform beam scale of known form provided with apparatus for indicating and recording decrease in weight. Fig. 3 shows the scale with a cylinder or container 50, which may contain compressed liquefied chlorine, set on the scale platform 12b, the container 50 being shown as provided with the usual shut-off valve 51 and regulating valve 52 for controlling the discharge of the chlorine through the pipe 53. The scale has the usual standard or pillar 55 near the upper end of which the scale beam 10b is pivoted. The usual counterpoise hook 56 connected to an eye at the outer end of the beam serves to carry the desired counterweight 13b, and the beam is provided with the usual sliding counterweight 14b.

Mounted on the pillar cap 57, is a casing 60 which has a removable end cover 61, and within which is mounted the re-balancing and indicating and recording mechanism which is similar in its construction and operation to that shown by Fig. 1, but which differs in some respects from the apparatus of Fig. 1.

The various operative parts within the casing 60 are carried by a frame 62. The clock movement 39b for driving the chart support, the frame of which is shown in Fig. 5, is mounted on the upper part of the casing and is connected to drive a chart support 38b which may be provided with any usual or suitable means for securing a chronographic chart to its front face. As shown, a finger screw 63 serves to lock the chart to the support, and a finger piece 64 at the back of the casing serves for turning the chart support to set the chart as desired with relation to the pen. A glass door 65 affords sight of the chart and may be opened to give access for removing and replacing the charts.

The motor 23b for tensioning the re-balancing spring 20b is a spring motor controlled as to its rate of operation by a clock train as in the apparatus of Fig. 1, the clock train having an escapement lever (not shown) from which an arm 27b extends downward. An escapement release lever 30b pivoted at 31b at a point intermediate its length on bracket arms extending from the frame 62 has one end connected by a cord or other suitable connection 21b to the end of the long arm of the scale beam 10b, and carries at its other end a stop pin or detent 26b which projects downward and cooperates with the end of the escapement arm which is bent to form, or is provided with, a horizontally extending engaging finger or lug 27b'. When the end of the lever 30b to which connection is made from the scale beam is drawn downward, the escapement arm will be released by upward movement of the other end of the lever.

The tensioning spring 20b has its lower end connected to the end of the escapement release lever to which the connection 21b from the scale beam is secured, and has its upper end connected by means of a flexible cord 66 to a tensioning member 22b which is operated by the tensioning motor 23b. The cord 66 passes upward to a pulley 67 and thence to the tensioning member 22b. The tensioning member 22b is secured fast on a shaft of the motor, and, in order that a given angular movement of the member at all points within its range of movement shall cause the same amount of tensioning of the spring, the member 22b is made in the form of a sector having a grooved peripheral edge in which the cord 66 seats as the tensioning member is turned to increase the tension of the spring.

The tensioning member 22b has secured to it a curved bracket 68 which extends downward and then curves forward and upward in front of the chart support and has adjustably secured thereto a pen arm 35b which is provided at its upper end with a pen 36b. The arm is secured in its positions of adjustment on the bracket 68 by means of a finger nut 69. This adjustment provides for setting the pen accurately with relation to the zero weight ruling of the chart.

Extending down from the bottom of the casing 60 is a beam bracket 70 formed to provide the usual stops for limiting the up and down movement of the scale beam, and with the usual eccentric beam locking piece 71 which may be operated by the finger piece 72 for locking the beam at its upward limit of movement.

When the scale beam is in its position of balance, the escapement release lever 30b stands in position with its stop 26b holding the escapement arm 27b against movement. When the long arm of the beam moves downward because of decrease of weight on the scale platform, the lever 30b is moved to release the escapement arm, permitting the tensioning motor to operate to turn the member 22b to increase the tension of the spring 20b and to move the recording pen. This movement continues until the spring 20b has been tensioned sufficiently to return the scale beam to its position of balance, at which time the pen will have recorded the weight on the chart and the escapement release lever will have been returned to its normal position to stop oscillation of the escapement arm, thus stopping the operation of the tensioning motor. The escapement arm will then be held by the stop 26b until the scale beam again moves from its position of balance and moves the lever 30b and stop 26b to release the escapement arm. The operation is thus essentially the same as the operation of the apparatus shown by Fig. 1 and need not be further described. As before, the force applied to re-balance the scale beam is measured to show the change in weight on the scale. The pen arm also serves as before as a visual indicator.

In order that the stop 26b shall most effectively cooperate with the engaging end of the escapement arm 27b to surely stop oscillation of the escapement arm when the escapement release lever moves back to a given position, it and the forwardly extending engaging end or finger 27b' of the escapement arm are formed as shown in detail in Figs. 6 and 7; that is, the stop 26b, formed by a pin or lug extending downward from the end of the lever 30b, has its lower end beveled toward the left in Fig. 6, so that on the right hand side it has a vertical face with a sharp bottom edge; and the forwardly extending end or engaging finger 27b' of the escapement arm is formed by a rounded rod or wire which has its left side, as viewed in Fig. 6, cut away or flattened to provide a vertical face to cooperate with the vertical face of the stop 26b. The result is that when the lever 30b moves downward to carry the stop 26b into position to engage the finger 27b', the escapement arm will come to rest with its engagement finger to the right of the stop 26b and will always be stopped whenever the stop 26b projects even slightly into the path of the upper edge of the finger 27b'.

While the drawings show construction in which the change in force exerted by the calibrated spring under the re-balancing operation of the motor is by increasing the tension of a tension spring, it is obvious that the operation might be by decreasing the tension of the spring or by changing the compression of a compression spring.

It is desirable in making the chronographic chart records to use charts ruled with regard to the expected range of weight change; that is, for measuring and recording change of weight over a range of, say, five pounds during a given period, it is desirable to use a chart with rulings spaced differently from those of a chart used when the change to be measured and recorded extends over a range of, say, three hundred pounds. The movement of the pen arm for a given change in weight must be different for such different charts, and must correspond to the chart rulings; and as the extent of movement of the pen arm for a given change in weight depends on the strength of the calibrated rebalancing spring, it is necessary, in order to use the apparatus with charts ruled for different ranges of weight change, to use for each chart a corresponding re-balancing spring. The spring 20b is, therefore, detachably connected to the end of the lever 30b and to the cord 65, so as to permit the spring readily to be changed according to the maximum change of weight to be recorded and the chart to be used.

It is desirable to provide for a slight relative adjustment longitudinally of the lever 30b of the points of connection to the lever of the spring 20b and the beam connecting cord 21b. For this purpose in the construction shown the spring 20b is connected to an adjustable connecting piece 75. By such adjustment slight inaccuracy in the mechanism such as inaccurate calibration of the spring 20b, which would otherwise affect the relation between the proportionate movement of the pen and the weight rulings of the chart, may be compensated for.

What is claimed is:

1. The combination with a beam scale and means for balancing the initial load, of means for automatically rebalancing the scale beam when the load on the scale changes, said means comprising a movable member, a spring connected between said movable member and the scale beam, a spring motor for moving said movable member to increase the tension of said spring, a clockwork train and escapement device for controlling the rate at which said member is moved by the spring motor, a stop device operable by the scale beam and engaging and cooperating with the escapement device to hold said member against tensioning movement when the beam is in its position of balance and to permit movement of said member when the beam moves from its position of balance; and weight-recording means controlled by said rebalancing device.

2. The combination of a scale beam fulcrumed intermediate its ends, load supporting means connected to one arm of said beam, means for applying a variable weight to the other arm to balance the initial load, a spring connected at one end to said beam, a spring motor means adapted to increase the tension of said spring, an escapement for controlling the operation of said motor, a movable stop means connected to said beam adapted to interrupt the oscillation of the escapement when the scale beam is in balanced position and to allow oscillation of the escapement and thereby operation of the motor to tension said spring when the scale beam moves out of balanced position, and means for indicating the change in weight of the initial load corresponding to the increase in tension produced by said spring motor.

3. The combination with a weighing scale, comprising a fulcrumed beam and a counterbalance, of motor operated means for restoring the beam to balance when it has become unbalanced by variation of the load, a clock operated chart, a marker movable by the beam restoring means, and a stop movable with the beam for holding the beam-restoring means against operation when the beam is in balanced position.

4. The combination with a weighing scale, comprising a fulcrumed beam and a poise, of a rebalancing spring for the beam, a motor for stressing the rebalancing spring, escapement means held, when the beam is in balance, to check the operation of the motor and released by movement of the beam in response to load decrease, a clock controlled chart, and a marker associated with the chart and moved by the motor.

5. The combination with a weighing scale, comprising a fulcrumed beam, of means for rebalancing the beam and chronographically recording variations in the load, comprising a rebalancing spring for the beam, an escapement-controlled motor adapted to stress the rebalancing spring, a clock controlled chart, and a marker associated with the chart and moved by the motor.

6. The combination with a weighing scale, comprising a fulcrumed beam and a counterbalance, of means for rebalancing the beam and chronographically recording variations in the load, comprising a beam rebalancing spring, a device for stressing said spring, means holding the spring stressing device inactive when the beam is balanced, a moving chart having a clock control, and a lever operated by the spring stressing device having a part connected to mark on the chart.

7. The combination with a scale having a balance member, of a spring motor having an escapement control, means connecting the spring motor with the balance member, a stop device arranged for movement by the balance member to hold said escapement against movement when said member is in its position of balance and to release said escapement when by change of weight on the scale said member is moved from its position of balance, and means controlled by said spring motor for recording change in weight on the scale.

8. The combination with a scale having a balance member, of means for rebalancing said member when the weight on the scale changes, said means comprising a calibrated spring connected to said member, spring motor means for changing the tension of said spring, an escapement for controlling said spring motor, a stop device connected to said balance member adapted to hold the escapement against movement when said member is in its position of balance and to release the escapement when by change in weight on the scale said member is moved from its position of balance, and means controlled by said spring motor means for showing change in weight on the scale.

CHARLES F. WALLACE.